United States Patent Office 3,069,903
Patented Dec. 25, 1962

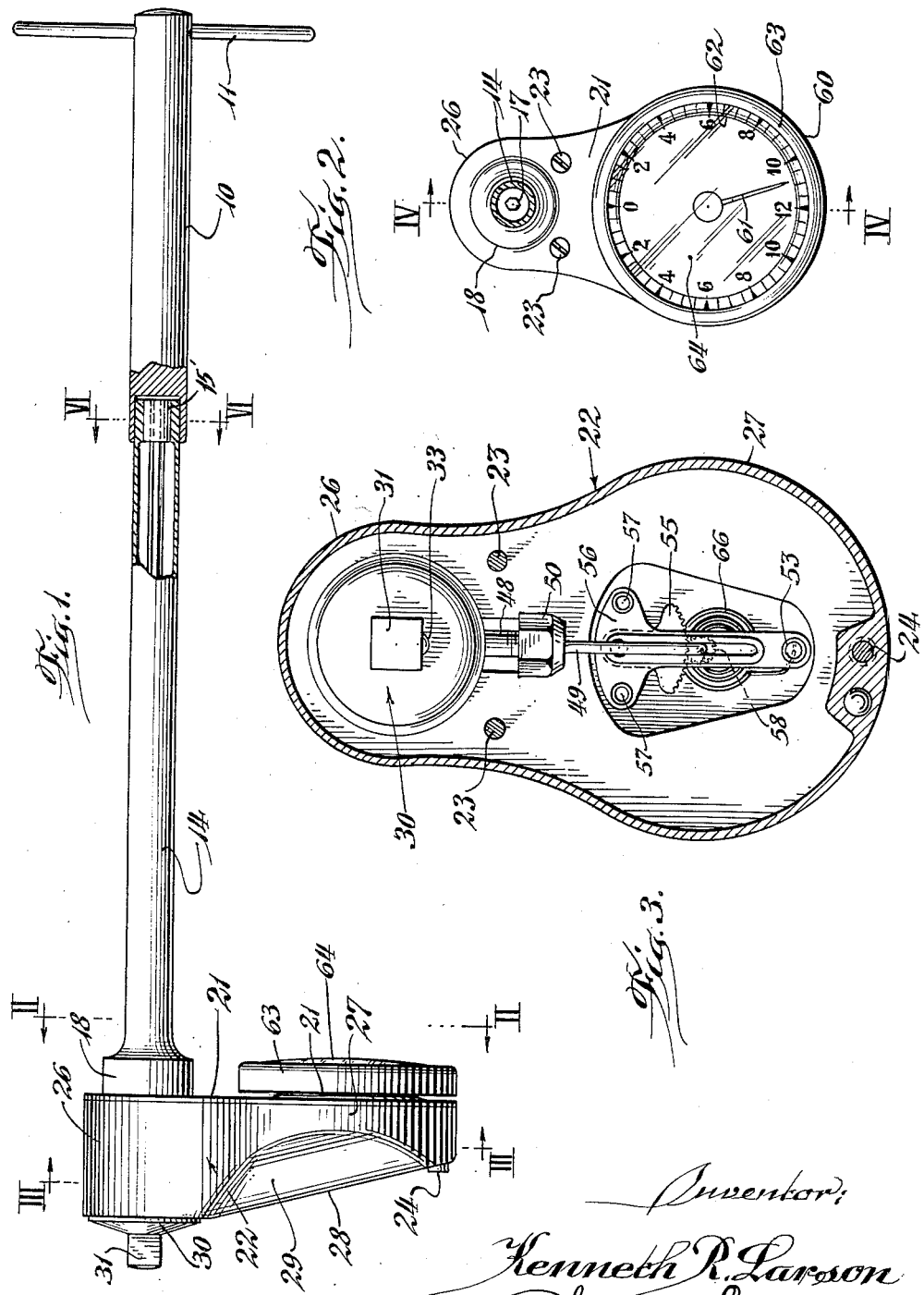

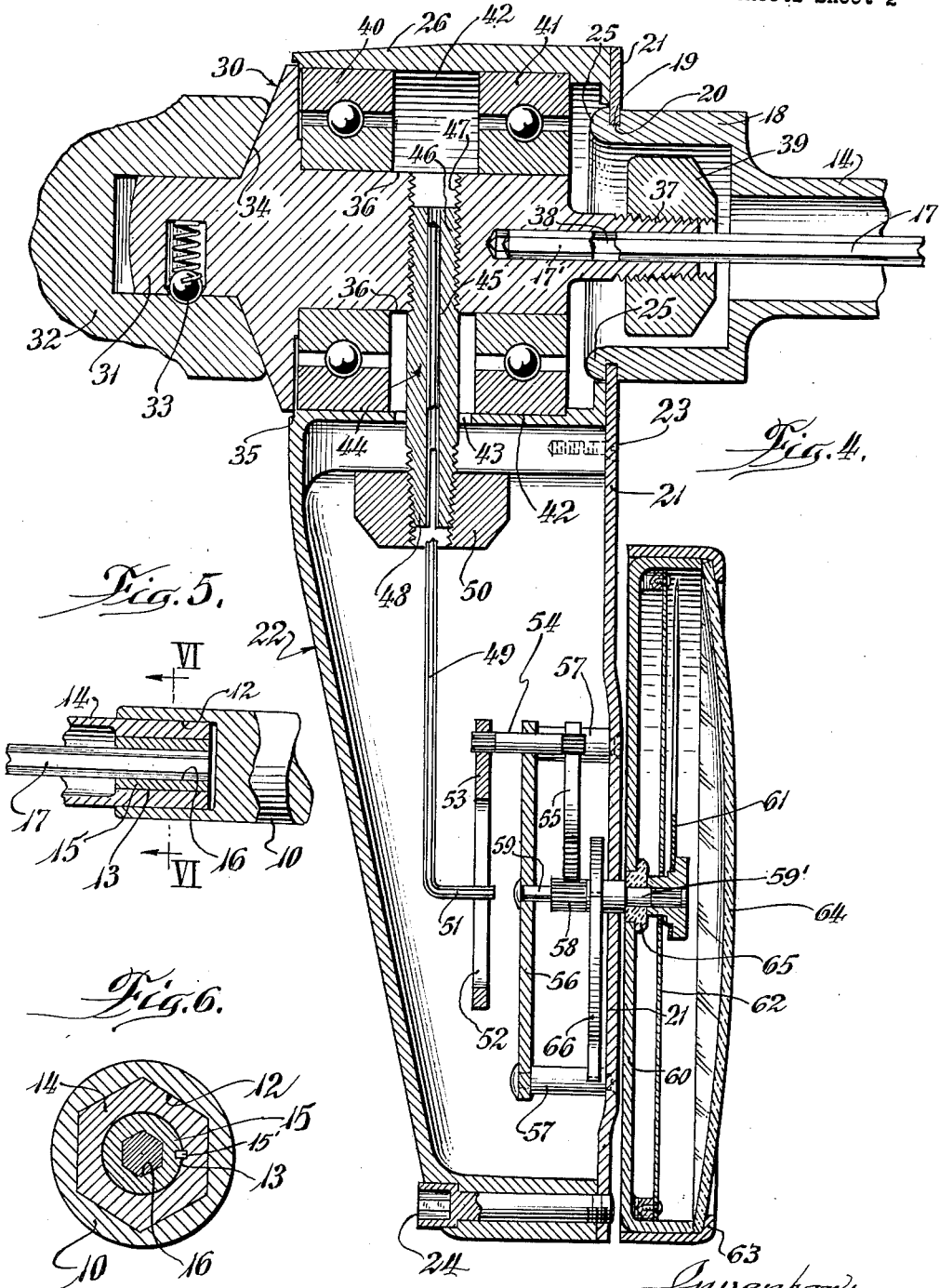

3,069,903
TORQUE MEASURING WRENCHES OF THE TORSION TYPE
Kenneth R. Larson, Des Plaines, Ill., assignor to Snap-On Tools Corporation, Kenosha, Wis., a corporation of Delaware
Filed July 26, 1957, Ser. No. 674,481
10 Claims. (Cl. 73—139)

This invention relates to nut turning devices and more particularly to torque measuring wrenches of the torsion type, although certain features thereof may be employed with equal advantage for other purposes.

It contemplates more especially the provision of simple, dependable, accurate, and readily changeable torsion elements for measuring devices so that any particular instrumentality may be utilized for different ranges in capacity without requiring a special capacity wrench for each range limit.

Although most torque wrenches operate upon the principle of measuring the flex of a beam which resists the manual turning force utilized in nut turning and similar operations, the present torque wrench utilizes the degree of twist deformation in a shank or shaft as the measuring expedient of the type shown and described in United States Letters Patents Nos. 2,312,104, 2,367,224, and 2,682,796 dated February 23, 1943, January 16, 1945, and July 6, 1954, respectively. This type of wrench has been found to produce better and more uniform results in that there are fewer moving parts, negligible friction, less bulky parts, and the substantial or total elimination of lag and free play which impair accuracy and uniformity.

It has been found, however, that there is a growing demand for low capacity torque wrenches and the like measuring inch ounces up to substantially high limits in foot pounds so that a large number of different capacity torque measuring wrenches were necessary to cope with these wide ranges of use. In order to minimize the number of such different range wrenches that are necessary for a given overall installation or facility, it has been found possible to provide readily changeable torsion resisting and measuring elements so graduated as to enable each wrench to provide a larger range of measuring limits with the desired sensitivity and accuracy by merely changing the torsion element that may be graduated and marked in multiples so that the same markings on the meter or dial thereof will provide the necessary interpolation without any appreciable calculation other than mental and visual observations.

The present invention overcomes the above noted limitations that are incidental to the known torque measuring instrumentalities by providing a very sensitive as well as upwardly graduated torsion resisting elements that may be readily substituted for each other without entailing any appreciable labor or time, thereby changing the capacity of the turning instrumentality and varying the range limits so substantially that a single wrench can do the work of as many as three of four wrenches of the present type that are permanently designed for particular capacities. Consequently, a technician who has occasion to assemble mechanisms having fastening expedients thereon of substantially different sizes which will require substantially different torque loads for tightening with precision and accuracy, can utilize a single torque measuring device therefor with the teachings of the present invention. This can be accomplished by merely changing the torsion resisting element of calibrated capacity and limits and still utilize the same meter thereon in that the torsion elements are calibrated in multiples of each other so that one will be an exact multiple of the other, thereby requiring a simple mental multiplication or division or utilization of decimals.

One object of the present invention is to provide an improved torque wrench of the torsion type wherein the torsion resisting element is readily changeable to vary the capacity range or limits thereof.

Another object is to provide an improved torsion wrench or measuring device which is suitable for accurate readings of fastener tightness between increased minimum and maximum limits of capacity.

Still another object is to provide an improved torsion type fastener turning and measuring device that is suitable for a wider range of accurate ranges without entailing much time or expense in the changeover from one range to another.

A further object is to provide an improved torsion resisting element mounting for torque measuring wrenches and the like so that various calibrated torsion elements may be substituted for a quick-change in the capacity thereof so that one measuring device will serve appreciably larger ranges of capacity without sacrificing accuracy or dependability.

A still further object is to provide an improved work engaging and torque measuring mount to improve the accuracy, sensitivity, and capacity of such measuring devices without appreciably increasing the production costs thereof.

Other objects and advantages will appear from the following description of an illustrated embodiment of the present invention.

In the drawings:

FIGURE 1 is a side view in elevation of a measuring device embodying features of the present invention.

FIGURE 2 is a sectional view in plan taken substantially along line II—II of FIGURE 1.

FIGURE 3 is a sectional plan view taken substantially along line III—III of FIGURE 1 to clarify the showing of the casing interior mechanisms.

FIGURE 4 is a sectional view in elevation taken substantially along line IV—IV of FIGURE 2.

FIGURE 5 is a fragmentary sectional view in elevation of the telescopic handle structural arrangement and showing the torsion resisting beam mounting bearing held against rotation by a standard key in complemental keyways.

FIGURE 6 is a sectional plan view taken substantially along line VI—VI of FIGURE 5.

The structure selected for illustration is not intended to serve as a limitation upon the scope or teachings of the invention, but is merely illustrative thereof. There may be considerable variations and adaptations of all or part of the teachings of the present invention depending upon the dictates of commercial practice. The embodiment herein illustrated and described comprises an elongated handle member 10 provided, in this instance, with a so-called T-handle cross-rod 11 for the effective turning of a nut or other fastener with a predetermined force to be measured accurately as will appear more fully hereinafter.

A fluted or polygonal socket 12 is provided in the other end of the handle member 10 to register with and for turning of the free end 13 of a tubular shank 14, a bearing 15 being provided with a hexagonal bore 16 therethrough to slidably receive a correspondingly shaped torsion resisting beam or element 17 therein or therethrough to serve as a mount for rotation with the handle and shank members 10—14 and to measure the torque turning load impressed upon a work engaging member in registry with a fastener that is being tightened or loosened as will appear more fully hereinafter. The bearing 15 is held against rotation relative to the shank 14 by means of a standard key 15' provided in complemental keyways provided in the adjacent portions of the tubular shank 14 and bearing 15.

The elongated tubular shank 14 extends downwardly (FIGURES 1, 5 and 6) to terminate in an elongated tubular and enlarged cyindrical hub 18 which has a reduced portion 19 (FIGURE 4) that extends through an opening 20 in a cover plate 21 complemental and attached to a chambered casing 22 by means of suitable fasteners 23—24 as will appear more fully hereinafter. The enlarged hub 18 has its reduced portion 19 extending through the cover plate opening 20, and the hub end is swaged therearound as at 25 to establish a rigid connection between the shank hub 18 and the casing cover plate 21.

The casing housing 22 is provided, in this instance, with a substantially cylindrical end portion 26 substantially concentric with the shank 14 and its hub 18 while an enlarged circular portion 27 offset therefrom is less deep or more shallow than the concentric casing housing portion 26 to confine the calibrated meter actuating mechanism to be hereinafter described. This requires the casing bottom 28, in this instance, to incline upwardly between the concentric cylindrical casing portion 26 and the offset enlarged circular portion 27 having symmetrical upwardly divergent side walls 29.

A work engaging member 30 consisting, in this instance, of a revoluble portion and a projecting driver end stub portion 31 which is preferably though not essentially of square cross-section, frictionally carries variously sized wrench sockets 32 held thereon by a spring impelled ball detent 33 of standard construction. The driver end stub shank 31 flares outwardly as at 34 to cover an enlarged circular opening 35 in the bottom of the cylindrical portion 26 of the casing 22. The work engaging member 30 then recedes to form a substantially reduced revoluble axial spindle 36 which projects through the casing portion 26 to terminate in a longitudinally slitted and externally threaded and somewhat tapered clutching member 37.

The clutching member 37 is tapered and extends into the hollow interior of the shank hub 18 to receive the other free end of the torsion resisting element 17 having a reduced extremity 17' that may be effectively clutched within an axial passage 38 provided in the spindle 36 and its projecting tapered clutching member 37. A threaded retainer nut 39 engages the tapered clutching member 37 to spring the latter into tight frictional engagement with the torsion resisting beam or element 17 to anchor it in operative relation with the work engaging member 30 for rotary connection with its axial spindle 36. A pair of ball bearing raceways 40 and 41 envelope the spindle 36 of the work engaging member 30 for rotary journalled support thereof with minimum friction in the internal bore 42 of the cylindrical casing portion 26.

The casing 26 with its axial internal bore 42 has a communicating transverse orifice 43 in the internal wall thereof (FIGURE 4) to accommodate a torsion translating rod mechanism 44 to be presently described. The torsion translating rod mechanism 44 consists, in this instance, of an axially hollow rod mount 45 which is externally threaded as at 46 to engage a correspondingly threaded bore 47 provided transversely through the work engaging spindle 36 between the ball bearing raceways 40—41. This enables the rod mount 45 to project through the opening 43 in the casing bore 42 to present an externally threaded and slitted tapered clutching retainer 48 similar in construction to the clutching retainer 37 previously described in connection with the torsion resisting element 17 that is confined in the handle shank 14 rather than in the casing 22 as is the usual arrangement.

A torsion translating rod 49 extends from the clutching retainer mount 48 to be held secure by a retainer nut 50 that engages the correspondingly threaded clutching retainer 48 to anchor the torsion translating rod 49 in the mount 44 for lateral projection from the work engaging spindle 36. The translating rod 49 may be extended or retracted within the axial bore of the rod mount 45 to enable longitudinal adjustment of the rod 49 relative to the indicator mechanism to be hereinafter described. The longitudinal adjustment of the rod 49 will vary the extent to which the dial mechanism is actuated or displaced responsive to a predetermined torsional stress imparted to the torsion resisting element 17 of the work engaging member 30.

This enables also the replacement of the rod 49 should occasion demand or should such become necessary impaired in any fastener turning operation just as the torsion resisting beam or element 17 is replaceable by other torsion measuring elements of the same lengths but of different calibrated capacities so long as the beam ends 17' are of the same reduced dimension and shape. It should be noted that the rod 49 functions exactly the same even though these were turned or otherwise shaped to constitute an integral part of the torsion translating member 44; however, such construction would be somewhat more expensive from a production standpoint than the operatively connected rods 44—49 serving as actuators for measuring instrumentalities when displaced by the twist imparted to the turning member and torque measuring element 17 when a nut is being turned by the socket 32 on the work engaging stub shaft 31.

The reduced rod extension 49 has a right angularly offset extremity 51 which projects transversely within the circular casing body portion 27 near the center thereof for registry with and projection within a longitudinally elongated slot 52 provided in a lever 53 that comprises a part of measuring and indicating instrumentalities to be presently described. The lever 53 is secured at one extremity thereof to a stub shaft 54 that carries a gear sector 55. The stub shaft 54 is journalled in a substantially T-shaped bracket 56 that is mounted by means of threaded studs 57, in this instance three, to the casing housing closure plate 21. The gear sector 55 meshes with a pinion 58 mounted on a stud shaft 59 journalled between the substantially T-shaped bracket 56 and the housing closure plate 21. The pinion stud shaft 59 projects through the housing closure plate 21 and a dial casing plate 60 to provide a shaft extension 59' within the dial casing and above the plate 60 thereof. The extension 59' carries an indicator pointer 61 attached thereto to confront an upwardly offset calibrated dial surface plate 62. The dial casing bottom plate 60 has the calibrated dial plate 62 attached thereto to designate inch ounces, inch pounds, and foot pounds in relation to the calibrated torsion measuring elements 17 so that the same calibrations 62 by interpolation with the designation on the torsion element 17 will serve for all ranges.

The degree of twist or torsional effect exerted on the torsion resisting beam 17 through the revoluble work engaging member 30 having its driver stub shaft 31 turning a fastener fitting socket 32 or the like responsive to the application of manual force to the handle 10—11, will be translated to the offset member 49 to a magnified extent by reason of the distance of the offset 51 thereon from the center of rotation, and this will actuate the meter lever 53 which operates the pointer 61 in relation to and commensurate with the calibrations 62 to register the exact torque that is being applied to tighten the fastener. It should be noted that the offset extremity 51 of the rod 49 will be displaced within the elongated slot 52 of the dial mechanism lever 53 responsive to longitudinally adjusting the rod 49 relative to the mount 44-48. This variation in the position of the rod offset 51 within the slot 52 of the lever 53 will enable the correct setting or resetting of the dial mechanism for any particular discrepancy that may arise owing to radical changes in climatic conditions or improper initial setting at the factory. This insures accuracy over a long period of time by the simple adjustment and positioning of the rod 49 relative to the mount 44-48.

The calibrated dial 62 is confined within a narrow dial ring 63 which cooperates with the dial casing plate 60 to constitute an exterior confining member for the pinion shaft 59, the indicator pointer 61 and the calibrated dial 62. A suitable transparent dial cover 64 is secured to the dial casing ring 63 to confine and serve as protection for the dial indicator 61 and the calibrated dial 62. The starting position for the dial indicator pointer 61 may be adjusted to zero on the dial 62 by having the dial casing plate 60 and its associated calibrated plate 62 witth the ring 63 and cover 64 manually displaceable by rotation relative to the indicator pointer 61 so that the latter may always be adjusted to zero or initial position after each operation or reading. This is accomplished by frictionally mounting the casing plate 60 on the stud shaft bearing 65 so that relative rotation is possible therebetween without any free movement to avoid accidental error.

The measuring instrumentalities described herein are returned to their initial position after the revoluble turning member 30 has been released from its load or nut turning operation, by means of a small spiral spring 66 that envelops the pinion and the indicator carrying shaft 59 to normally urge or return the indicator mechanism and the parts thereof to their initial position. This mechanism is assembled as a unit to the dial casing plate 60 and is axially carried by the exterior cover plate 21 of the circular housing portion 27 which is provided, in this instance, with three apertures for receiving correspondingly spaced fastener mounting posts 57 to effect the support thereof by the cover plate 21. This will enable the meter mechanism to be confined in the casing portion 27 offset from the revoluble work engaging member 30 and provide clear vision for reading the meter dial 62, and the line of sight is still in the direction of the work which is important in many fastening operations.

With the arrangement of parts above described, it will be apparent that a very simple, inexpensive and highly accurate torque measuring wrench has been provided wherein there are few moving parts and the friction thereof has been reduced to a minimum to preclude variable and inaccurate readings. The replaceable torsion measuring elements 17 of different multiple capacities provides a substantially increased range for a single tool of this character, and enhances the usefulness thereof. The user can readily replace the torsion element should such become stretched or abused and this is accomplished without sending the tool back to the factory. These features coupled with the fact that the torsional twist imparted by the turning load is measured at the point of maximum displacement of the elongated dial mechanism actuator rod, eliminates or reduces to a negligible minimum any inaccuracies even at small loads. With an elongated torsion measuring element 17, slight loads will provide appreciable twists and because the handle and shank members 10—14 accommodate this element there is compactness with the desired sensitivity for small torque loads as well as appreciable capacities by merely changing the measuring element.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a torque wrench, the combination with a casing, of a work engaging head member revolubly mounted in said casing, an elongated tubular handle member rigidly extending from said casing, a torsion resisting elongated rod mounted in said elongated handle member, complemental torsion rod engaging means on said work engaging member and said handle member to provide a readily detachable operative telescopic connection between said revoluble work engaging head member and said handle member through said torsion resisting rod interfitting therewith, torque indicating means on said casing, calibrated torsion measuring instrumentalities in said casing and interposed between said torque indicating means and said torsion resisting elongated rod, and torsion translating means interposed between said work engaging head member and said torque indicating means through said calibrated torsion measuring instrumentalities to register the degree of twist imparted to said torsion resisting elongated rod by the turning load sustained by said work engaging head member in tightening a fastener therewith.

2. In a torque wrench, the combination set forth in claim 1 wherein the torsion resisting elongated rod is readily replaceable with rods of different calibrated capacities to enlarge the range of use for tightening purposes.

3. In a torque wrench, the combination set forth in claim 1 wherein the handle member is disposed normal to the casing and the torque indicating means are offset from the handle member for direct reading along a path parallel to the handle member.

4. In a torque wrench, the combination set forth in claim 1 wherein the torsion resisting rod is in axial alignment with and independent from said work engaging head member and said torsion translating means are normal to said torsion resisting rod.

5. In a torque wrench, the combination set forth in claim 1 wherein the elongated handle member comprises separable telescopic parts to enable the ready replacement or substitution of the torsion resisting rod.

6. In a torque wrench, the combination set forth in claim 1 wherein the revoluble work engaging head member is journalled in the casing by ball bearing raceways and wherein the torque indicating means are mounted on a lateral extension of the casing offset from the handle member to afford a clear path of vision parallel to said casing handle member.

7. The combination set forth in claim 5 wherein the torsion resisting rod is readily replaceable or substituted in the separable telescopic parts of said handle member.

8. In a torque wrench, the combination set forth in claim 4 wherein the elongated handle member comprises separable parts to enable the replacement of the torsion resisting rod without dismantling the casing.

9. In a torque wrench, the combination set forth in claim 3 wherein the torsion resisting rod is in axial alignment with and independent of said work engaging head member, the said elongated handle member comprises separable telescopic parts to enable the replacement of the torsion resisting rod without dismantling the casing.

10. In a torque wrench, the combination set forth in claim 9 wherein the revoluble work engaging head member and said casing have interposed ball bearing raceways, and torsion translating means extend normally from said revoluble work engaging head member to operatively connect to said torque indicating means.

References Cited in the file of this patent

UNITED STATES PATENTS

| 2,367,224 | Larson et al. | Jan. 16, 1945 |
| 2,400,978 | Collins | May 28, 1946 |
| 2,464,372 | Booth | Mar. 15, 1949 |

FOREIGN PATENTS

| 745,891 | Germany | Dec. 2, 1944 |